US012640658B2

(12) United States Patent
Karri et al.

(10) Patent No.: US 12,640,658 B2
(45) Date of Patent: May 26, 2026

(54) BI-DIRECTIONAL COMMUNICATION SCHEME BETWEEN PRIMARY AND SECONDARY FOR FLY-BACK AC-DC CONVERTERS

(71) Applicant: Cypress Semiconductor Corporation, San Jose, CA (US)

(72) Inventors: Rajesh Karri, Visakhapatnam (IN); Arun Khamesra, Bangalore (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 356 days.

(21) Appl. No.: 18/447,090

(22) Filed: Aug. 9, 2023

(65) Prior Publication Data

US 2025/0055379 A1 Feb. 13, 2025

(51) Int. Cl.
*H02M 3/335* (2006.01)
*H02M 1/00* (2006.01)
(52) U.S. Cl.
CPC ..... *H02M 3/33584* (2013.01); *H02M 1/0058* (2021.05)
(58) Field of Classification Search
CPC ........................ H02M 3/33584; H02M 1/0058
See application file for complete search history.

(56) References Cited

U.S. PATENT DOCUMENTS

| | | | | |
|---|---|---|---|---|
| 11,114,945 | B2 * | 9/2021 | Ahmed | H02M 3/33592 |
| 12,143,023 | B2 * | 11/2024 | Karri | H02M 1/342 |
| 2021/0257922 | A1 | 8/2021 | Bessegato et al. | |
| 2022/0239233 | A1 | 7/2022 | Bessegato et al. | |
| 2024/0421717 | A1 * | 12/2024 | Mondal | H02M 3/33592 |

OTHER PUBLICATIONS

"UCC28780 High Frequency Active Clamp Flyback Controller", Texas Instruments Incorporated, Oct. 2017, Feb. 2018 (Revised), 70 pages.

* cited by examiner

*Primary Examiner* — Adolf D Berhane

(57) ABSTRACT

An USB-PD power converter with primary and secondary side controllers that bidirectionally communicate with each other. In one embodiment, the USB-PD power converter has a first transformer in data communication with the primary-side controller and the secondary-side controller. The secondary-side controller is configured to generate control signals and receive acknowledgement signals from the primary-side controller via the first transformer. The primary-side controller is configured to generate the acknowledgment signals and receive the control signals from the secondary-side controller via the first transformer.

19 Claims, 9 Drawing Sheets

BI-DIRECTIONAL COMMUNICATION SCHEME BETWEEN PRIMARY AND SECONDARY FOR FLY-BACK AC-DC CONVERTERS

TECHNICAL FIELD

The present disclosure relates generally to the field of power conversion, and more particularly to bidirectional communication between a primary-side controller and a secondary-side controller of an isolated converter.

BACKGROUND

An electrical power converter is a device for converting electrical power from one form into another. A flyback converter is one type of converter. The present disclosure will be made with respect to a flyback converter it being understood the present disclosure can find application in other types of power converters.

BRIEF DESCRIPTION OF THE DRAWINGS

The present disclosure is illustrated by way of example, and not by way of limitation, in the figures of the accompanying drawings in which like reference numerals refer to similar elements and in which.

DETAILED DESCRIPTION

Figure 1:
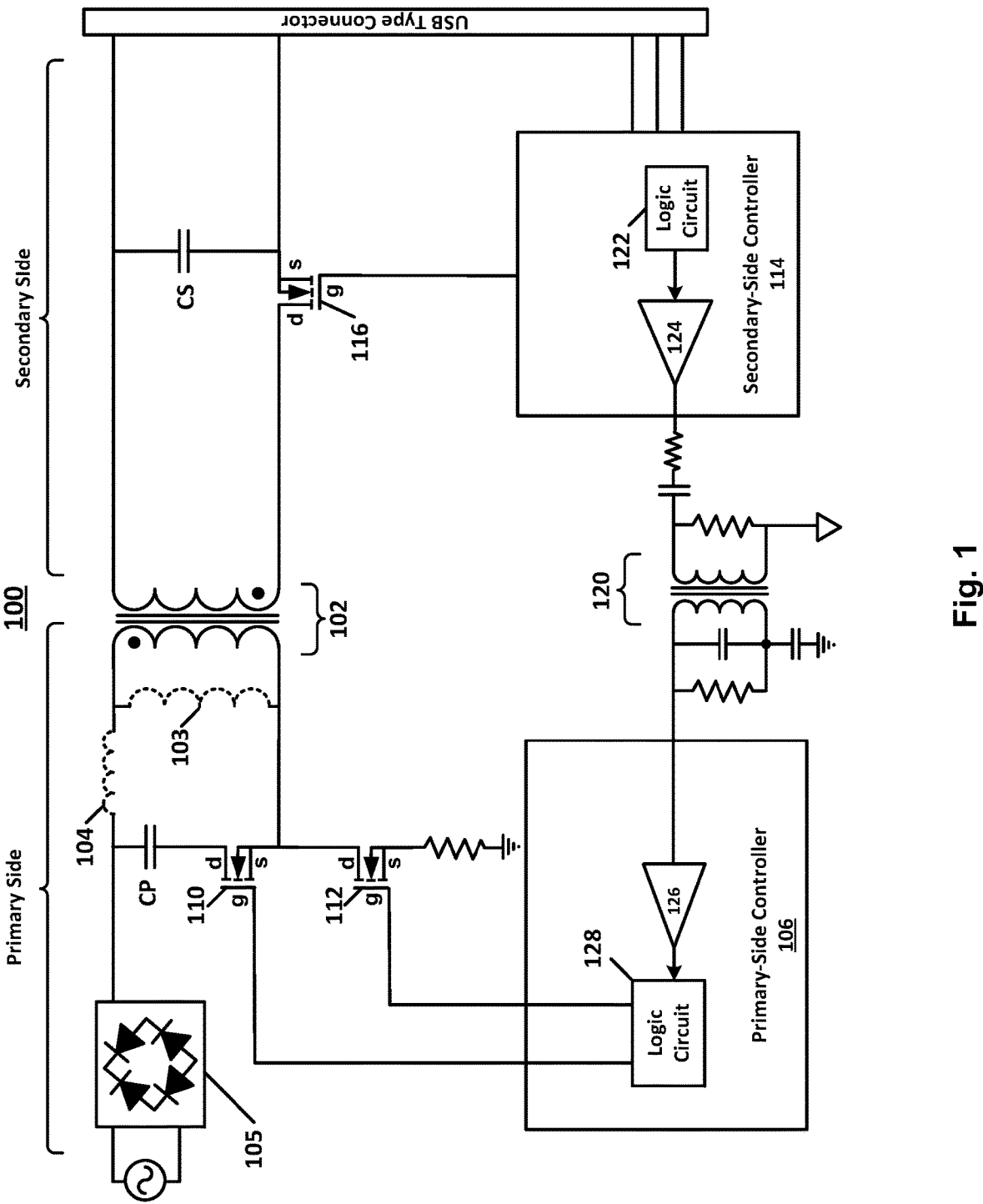
FIG. 1 is a block diagram illustrating relevant components of a flyback converter.

The following description sets forth numerous specific details such as examples of specific systems, components, methods, and so forth, to provide a good understanding of various embodiments of the techniques described herein for bidirectional communication between primary-side and secondary-side controllers in flyback converters.

However, it will be apparent to one skilled in the art that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for bidirectional communication between primary-side and secondary-side controllers in flyback converters for electronic devices that can deliver power according to a USB Power Delivery (USB-PD) specification. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for AC-to-DC power adapters, GaN-based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with USB Type-C PD capability. These embodiments allow for more efficient performance, allowing lower-rated, and thus cheaper, field effect transistors (FETs) to be used by engaging an active clamp FET on the primary side by the secondary-side controller, which determines to turn ON/OFF the active clamp FET based on parameters determined or detected on the secondary-side. Active clamp circuits may also help reduce electromagnetic interference (EMI), which helps in reducing filters on the input.

A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications. Still, it extends the performance of the SuperSpeed bus by a collection of features referred to as Enhanced SuperSpeed.

A more recent technology for USB connectors, called USB Type-C (also referred to as USB-C), is defined in various releases and/or versions of the USB Type-C specification (e.g., such as Release 1.0, Release 1.1, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1/3.2, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors (also referred to as USB-C connector), etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. The Type-C plug and the Type-C receptacle are designed as a reversible pair that operates regardless of the plug-to-receptacle orientation for ease of use. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0, Revision 2.0, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power (or even higher, in case of Extended Power Range, EPR, implementations). According to the USB-PD specification, devices with USB Type-C ports (e.g., USB-enabled devices) may negotiate for more current and/or higher or lower voltages over a USB Type-C cable than are allowed in older USB specifications (e.g., the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that both devices can accommodate and can be dynamically re-negotiated (e.g., without device unplugging) upon request by either device and/or in response to various events and conditions, such as power role swap, data role swap, hard reset, failure of the power source, etc.

A flyback converter, e.g., such as USB-PD adapter, can convert AC power to DC power, or DC power to DC power. The present disclosure will be made with reference to flyback converters that convert AC power to DC power, it being understood the present disclosure should not be limited thereto.

The flyback converter is a simple and widely used topology for isolated AC/DC power conversion. It uses a coupled inductor to transfer energy between an input and an output. A coupled inductor includes a transformer, an inherent magnetizing inductance that is connected in parallel with the primary winding of the transformer, and an inherent leakage inductance connected in series with the parallel combination of the magnetic inductance and the primary winding.

The flyback converter switches between charging and discharging in each cycle of operation. During the charging portion of a switching cycle, energy is stored in the form of magnetic fields in the coupled inductor's magnetic inductance and the coupled inductor's leakage inductance. During the discharging portion the magnetic fields collapse, and the energy in the magnetic inductance is transferred to the output through the transformer.

An active clamp (AC) flyback converter is an enhanced version of the traditional flyback converter and aims to improve efficiency and reduce stresses on converter components. AC flyback converters are often used to convert power in the low-to-mid power range (about 2 W to 100 W). Overall, AC flyback converters are widely used in various applications, such as power supplies for electronic devices, battery chargers, and other low-to-medium power applications where voltage conversion is required.

AC flyback converters transfer energy stored in the leakage inductance that would traditionally be dissipated in a passive clamp snubber resistor during the discharging portion of the switching cycle. The present disclosure will be made with respect to an AC flyback converter, it being understood that non-active clamp aspects of the present disclosure can find application to traditional flyback converters.

An AC flyback converter includes an active clamp circuit that provides a path for energy stored in the coupled inductor's leakage inductance to the AC flyback converter's output. The active clamp circuit typically includes a clamp capacitor, and a clamping switch. For purposes of explanation only, switches of this disclosure will take form in MOSFETs, it being understood that the term switches should not be limited thereto.

The switching cycle of AC flyback converters has three portions; a charging portion, a discharging portion, and an ACF portion. The charging portions for both the traditional flyback converter and the AC flyback converter are substantially identical. In both, energy is stored in the form of magnetic fields in the magnetic and leakage inductances. The discharging portions of the switching cycles in the AC flyback converter and the traditional flyback converter have similarities. In both the magnetic fields in the leakage and magnetic inductances collapse, and energy in the magnetic field of the magnetic inductance is transferred to the secondary side of the ideal transformer. However, during the discharging portion within the AC flyback converter, the energy from the collapsing field in the leakage inductance is transferred to and stored in the clamp capacitor via a forward biased diode of the clamp MOSFET.

As noted, the AC flyback converter includes the active clamp portion in its switching cycle. During the active clamp portion, the energy stored in the clamp capacitor is transferred to the secondary side of the ideal transformer through the activated clamp MOSFET rather than being dissipated as heat through a snubber circuit.

Primary-side controlled converters and secondary-side controlled converters are two different approaches for controlling the operation of traditional flyback converters and AC flyback converters. In both types, the primary side typically includes an input rectifier, a clamp MOSFET, a primary MOSFET, and a primary-side controller (PSC), while the secondary side includes a secondary MOSFET, an output capacitor and a secondary-side controller (SSC). The main difference primary-side controlled and secondary-side controlled converters relates to whether the PSC or the SSC controls the converter operation. In the secondary-side controlled flyback converter, the SSC is responsible for controlling operation of the flyback converter while the PSC takes a subordinate role. The present disclosure will be made with reference to a secondary-side controlled flyback and AC flyback converters, it being understood the present disclosure should not be limited thereto.

Most secondary-side controlled AC flyback converters (and traditional secondary-side controlled flyback converters) are flawed. To illustrate FIG. 1 illustrates an example secondary-side controlled USB-PD AC flyback converter 100 with an active clamp circuit. The power output of USB-PD AC flyback converter 100 is connected to a USB-C connector.

USB-PD AC flyback converter 100 includes a conductive inductor, which is represented as an ideal transformer 102 with primary and secondary windings, inherent magnetic inductance 103 and inherent leakage inductance 104. Inherent magnetic and leakage inductances are artifacts of a conductive inductor and are represented in the figures with dashed lines. A diode rectifier 105 is coupled between transformer 102 and a power input for receiving AC input power. Bridge rectifier 105 converts AC input voltage into a rectified input voltage that is provided to transformer 102.

The primary side of USB-PD AC flyback converter 100 includes a PSC 106, a primary MOSFET 112, and an active clamp (AC) circuit, which includes a clamp MOSFET 110 and clamp capacitor CP. PSC 106 controls clamp MOSFET 110 and primary MOSFET 112 based on control signals received from secondary-side controller 114 as will be more fully described below.

The secondary side of USB-PD AC flyback converter 100 includes a secondary capacitor CS and an SSC 114 that controls secondary-side MOSFET 116. SSC 114 indirectly controls clamp MOSFET 110 and primary MOSFET 112 through PSC 106. A pulse transformer 120 transmits control signals from SSC 114 to PSC 106 for controlling MOSFETs 110 and 112. As a secondary-side controlled converter, USB-PD AC flyback converter 200 is not configured to transmit signals from PSC 106 to SSC 114 through pulse transformer 120.

SSC 114 includes an SSC logic circuit 122 and signal transmitter 124. PSC 106 includes a PSC logic circuit 128 that receives control signals from SSC logic circuit 122 via pulse transformer 120 and receiver 126.

SSC logic circuit 122 can generate signals that control secondary side components such as secondary MOSFET 116. SSC logic circuit 122 can also generate control signals, which are transmitted to PSC 106 via transmitter 124 and pulse transmitter 120. In response to receiving control signals, PSC logic circuit 128 can activate or deactivate MOSFETs 110 or 112. For example, at the start of the charging portion of a switching cycle, PSC logic circuit 128 can activate primary MOSFET 112 in response to receiving a first control signal from SSC logic circuit 122 via pulse transformer 120. USB-PD AC flyback converter 100 should be operated so that primary MOSFET 110 and secondary MOSFET 116 are not activated at the same time. Thus, SSC logic circuit 122 should deactivate secondary MOSFET 116 when SSC logic circuit 122 sends the first control signal to PSC logic circuit 128 for activating primary MOSFET 112. After primary MOSFET 112 activates, current energizes magnetic inductance 103 and leakage inductance 104. After a predetermined amount of time, the discharging portion of the switching cycle starts. More particularly SSC logic circuit 122 generates and sends a second control signal to PSC logic circuit 128 for deactivating primary MOSFET 112. SSC logic circuit 122 should also activate secondary MOSFET 116 when it sends the second control signal. In response to receiving the second control signal, PSC logic circuit 128 deactivates primary MOSFET 112. When deactivated, the magnetic field in the magnetic inductance 103 collapses, and the energy is transferred to the secondary winding. The magnetic field in the leakage inductance 104 also collapses sending current to charge active clamp capacitor CP via forward biased body-diode of clamp MOSFET 110. After a predetermined amount of time, the discharging portion of the switching cycle ends and the ACF portion begins. More particularly, SSC logic circuit 122 sends a third control signal to activate clamp MOSFET 110 while secondary MOSFET 116 remains in the active state. In response to receiving the third control signal via pulse transformer 120, PSC logic circuit 128 activates clamp MOSFET 110 to allow clamp capacitor CP to discharge through the primary winding, thereby transferring energy to the secondary winding. Eventually, SSC logic circuit 122 sends a fourth control signal to PSC logic circuit 128 to deactivate clamp MOSFET 110 and end the ACF portion. With clamp MOSFET 110 deactivated, current drawn by the primary winding of transformer 102 can discharge the parasitic capacitance between the drain d and source s of primary MOSFET 112 to zero voltage or near zero voltage. Discharging the parasitic capacitance enables zero-volt or near zero-volt activation of primary MOSFET 112 in the next switching cycle of USB-PD AC flyback converter 100, which reduces switching losses in primary MOSFET 112 that would otherwise occur. However, the effectiveness of discharging the parasitic capacitance depends on the time during which clamp MOSFET 110 is activated. After PSC logic circuit 122 deactivates MOSFET 110, the switching cycle repeats with SSC logic again sending the first control signal. Importantly, primary MOSFET 112 and secondary MOSFET 116 should not be activated at the same time.

Pulse transformer 120 in FIG. 1 is used for one-way signal transmission from SSC logic circuit 122 to PSC logic circuit 128 as described above. PSC logic circuit 128 does not send signals to logic circuit 122. As a result, PSC logic circuit 128 cannot send a signal confirming that it has received a control signal to activate or deactivate clamp MOSFET 110 or primary MOSFET 112. Likewise, PSC logic circuit 128 cannot send a signal confirming that clamp MOSFET 110 or primary MOSFET 112 has activated or deactivated. USB-PD AC flyback converter 100 works well if PSC logic circuit 128 receives all control signals from SSC logic circuit 122 as described above, and if PSC logic circuit 128 does not receive false control signals. However, if PSC logic circuit 128 does not receive a control signal sent by SSC logic circuit 122, or if PSC logic circuit 128 receives a false control signal, USB-PD AC flyback converter 100 could be placed in a state in which both primary MOSFET 112 and secondary MOSFET 116 are activated at the same time. For example, receiver 126 may receive a false control signal from pulse transformer 120 that was induced by, for example, a nearby ESD event. The false control signal unfortunately may cause PSC logic circuit 128 to activate primary MOSFET 112 while secondary MOSFET 116 is activated. The lack of bidirectional communication in USB-PD AC flyback converter 100 also complicates active clamp flyback mode. If the PSC logic circuit 128 misses either the third or fourth control signal mentioned above, the cycle becomes disrupted. Also, the SSC logic circuit 122 cannot receive information about the voltage at drain d of primary MOSFET 110, which can be useful in achieving true zero volt switching of MOSFET 110 by SSC logic circuit 122 adjusting the timing of when the next switching cycle should begin. Other flaws may also exist with USB-PD AC flyback converter 100.

A novel duplex communication scheme is presented in which a PSC and an SSC communicate bidirectionally with each other in a secondary-side controlled USB-PD flyback converter to make it more reliable and efficient. As noted above, the SSC is mostly oblivious about whether the PSC receives control signals in prior flyback converters or prior traditional flyback converters. To avoid this situation, the PSC of the present disclosure incorporates an acknowledgement generator, which can be used to send acknowledgements and other signals to the SSC. For example, whenever the PSC successfully receives a control signal from the SSC to activate or deactivate the primary MOSFET or the clamp MOSFET, the PSC can send a high-voltage or low-voltage pulse signal to the SSC as an acknowledgement. A receiver is added into the SSC in one embodiment of the present disclosure to detect acknowledgement and other signals from the PSC. SSC can use the acknowledgment and other signals it receives through the receiver to prepare its next action. Other advantages of the present disclosure are described below.

Figure 2:
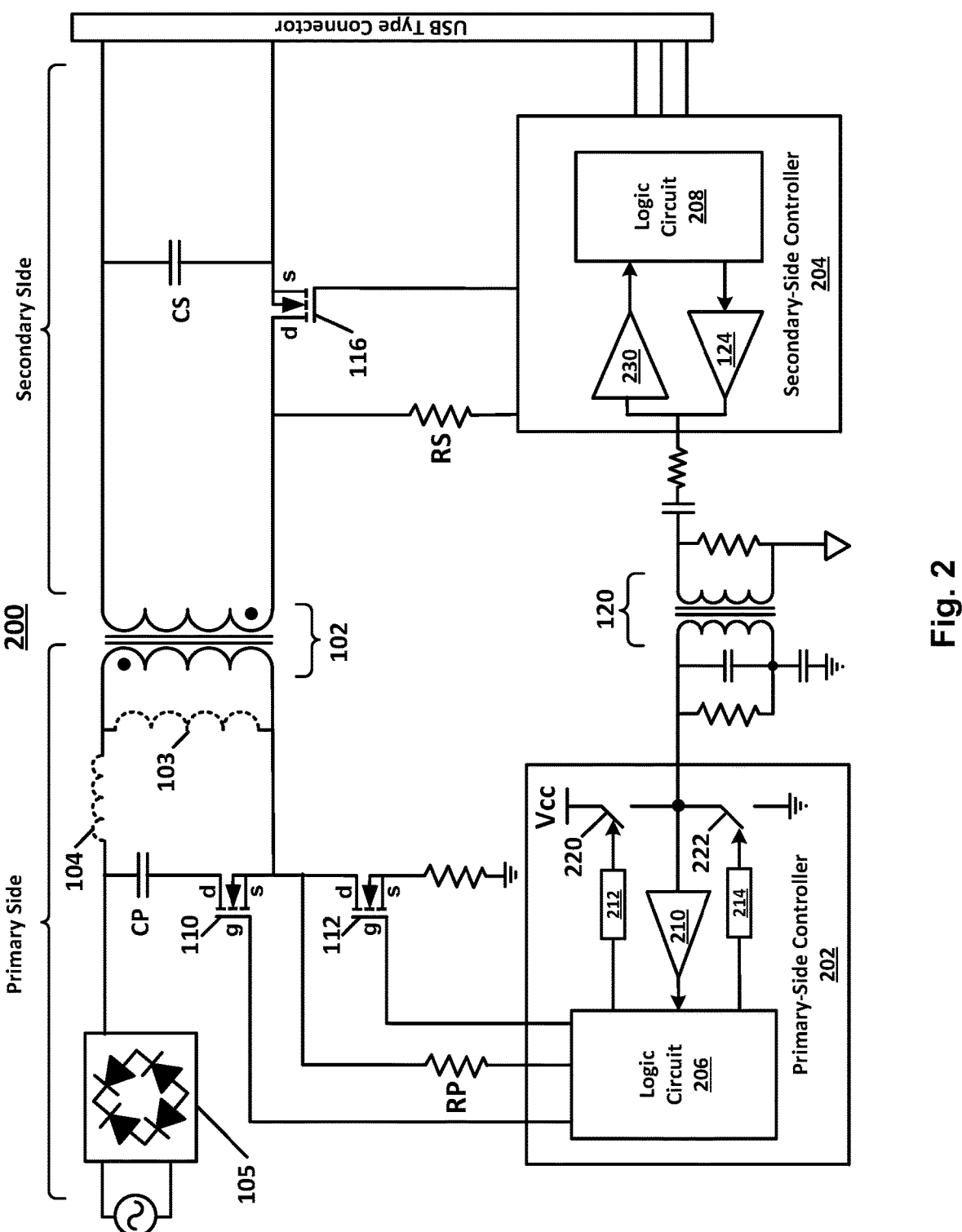
FIG. 2 is a block diagram illustrating relevant components of a flyback converter employing one embodiment of the present disclosure.

FIG. 2 illustrates a secondary-side controlled USB-PD AC flyback converter 200 employing bidirectional communication according to one embodiment of the present disclosure. USB-PD AC flyback converter 200 includes many of the same components as USB-PD AC flyback converter 100 shown in FIG. 1. For example, USB-PD AC flyback converter 200 includes bridge rectifier 105 connected to the coupled inductor that includes transformer 102, inherent magnetic inductance 103 and inherent leakage inductance. The primary side includes PSC 202, a primary MOSFET 112 (also referred to as low-side FET), and active clamp circuit, which in turn includes clamp MOSFET 110 (also referred to as high-side FET) and clamp capacitor CP. PSC 202 controls clamp MOSFET 110 and primary MOSFET 112 based on control signals received from SSC 204 as will be more fully described below. The term control signal is used broadly to include a single signal, or multiple signals. A control signal can take many different forms. For example, a signal can be a high-voltage pulse signal, or a low-voltage pulse signal. A signal may take form in a leading or falling edge of a pulse. A signal can take form in a ramp signal in which the signal voltage rises from a low value at a linear rate until it reaches a maximum value at which point the signal immediately drops to the low voltage value. The control signal may include two or more signals of different forms. For example, a control signal may include two high-voltage pulses followed by one low-voltage pulse. Or a control signal may include a high-voltage pulse followed by a ramp pulse. The term control signal should not be limited to any number, combination or form of signals.

The secondary side of USB-PD AC flyback converter 200 includes secondary capacitor CS, resistor RS and SSC 204, which controls secondary-side MOSFET 116, and indirectly controls clamp MOSFET 110 and primary MOSFET 112 via PSC 202. SSC monitors the voltage at the drain d of secondary MOSFET 116 through resistor RS. USB-PD AC flyback converter 200 includes pulse transformer 120 for transmitting signals back and forth between PSC 202 and SSC 204 in both directions.

PSC 202 includes a PSC logic circuit 206 that controls the gates of MOSFETs 110 and 112. PSC logic circuit 206 may include hardware (e.g., circuitry, dedicated logic, programmable logic, etc.), software, firmware, or a combination thereof. PSC logic circuit 128 can measure the voltage across the drain and source of primary MOSFET 112 via resistor RP. PSC logic circuit 206 also controls a signal generator, which in turn includes gate drivers 212 and 214, and switches 220 and 222 (e.g., MOSFETs). PSC logic circuit control gate drivers 212 and 214, which in turn control the gates of switches 220 and 222, which are connected in series between a supply voltage Vcc and primary-side ground. As will be more fully described below the signal generator, which includes the combination of gate drivers 212 and 214, and switches 212 and 222, enable PSC logic circuit 206 to send high-voltage and/or low-voltage signals to SSC 204 via pulse transformer 120. PSC 202 also includes a receiver 210 in data communication with pulse transformer 120. Receiver 210 is configured to receive control signals from SSC 204 via pulse transformer 120. The output of receiver 210 is connected to an input of PSC logic circuit 206. As will be more fully described below PSC logic circuit 206 controls clamp MOSFET 110 and primary MOSFET 112 based upon the control signals it receives from SSC 204 via receiver 210.

SSC 204 includes an SSC logic circuit 208 in data communication with a receiver circuit 230 and transmitter circuit 124, each of which is in data communication with PSC 202 via pulse transformer 120. SSC logic circuit 208 may include hardware (e.g., circuitry, dedicated logic, programmable logic, etc.), software, firmware, or a combination thereof. Receiver 230 is configured to receive and forward signals (e.g., high-voltage and/or low-voltage pulse signals) it receives from PSC 202 via pulse transformer 120. SSC logic circuit 208 implements various methods in response to receiving these signals as will be more fully described below. Transmitter 124 transmits control signals to receiver 210 via pulse transformer 120. PSC logic circuit 206 responds to these control signals as will be more fully described below.

Figure 3:
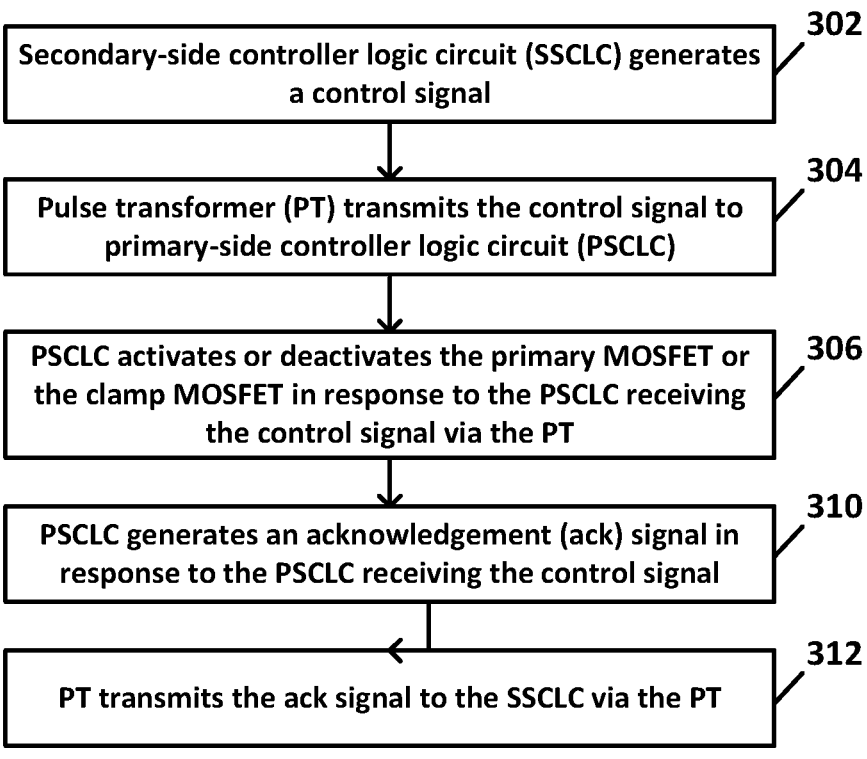
FIG. 3 is a flow diagram illustrating relevant aspects of a method employing one embodiment of the present disclosure.

SSC logic circuit 208 and PSC logic circuit 206 bidirectionally communicate with each other to enable a safer, and more efficient operation of USB-PD AC flyback converter 200. With continuing reference to FIG. 2, FIG. 3 illustrates general aspects of bidirectional communication between SSC logic circuit 208 and PSC logic circuit 206 according to one embodiment the present disclosure. The method in FIG. 3 begins when SSC logic circuit 208 generates a control signal as shown in step 302. For example, SSC logic circuit 208 may generate a control signal for activating or deactivating clamp MOSFET 110 or primary MOSFET 112. The control signal is transmitted to PSC logic circuit 206 via pulse transformer 120. In step 206 PSC logic circuit 206 responds to the control signal. For example, PSC logic circuit 206 activates or deactivates primary MOSFET 112 or clamp MOSFET 110 in response to PSC logic circuit 206 receiving the control signal sent by SSC logic circuit 206 via pulse transformer 120. In step 310 PSC logic circuit 206 generates a high-voltage or low-voltage acknowledgment signal in response to the PSC logic circuit 206 receiving the control signal. This acknowledgment signal can be generated, for example, before, after or while PSC logic circuit 206 activates or deactivates the primary MOSFET 112 or the clamp MOSFET 110. In step 312 PSC logic circuit 206 transmits the acknowledgment signal to SSC logic circuit 208 via the pulse transformer 120.

Figure 4:
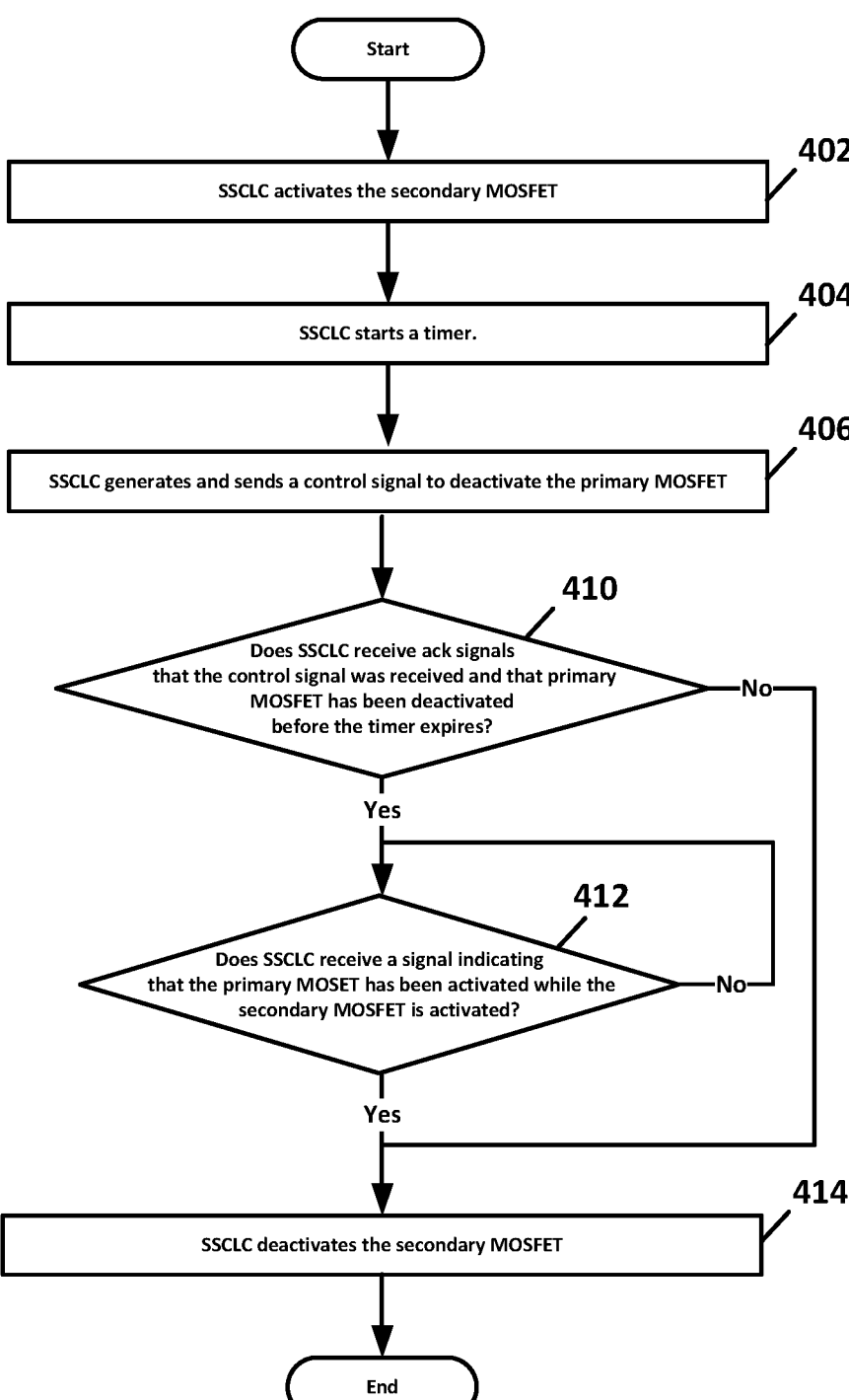
FIG. 4 is a flow diagram illustrating relevant aspects of a method employing one embodiment of the present disclosure.

As noted above with respect to USB-PD AC flyback converter 100 in FIG. 1, there is a major reliability concern during operation of USB-PD AC flyback converter 100. While the secondary MOSFET 116 is active and conducting current to a load, a system ESD event may prompt PSC logic circuit 206 to falsely activate primary MOSFET 112. If this were to happen a short circuit could be created, which will damage the converter. This problem can be solved using the duplex communication system of the present disclosure. With reference to FIG. 2 PSC logic circuit 206 can send an acknowledgement signal to SSC logic circuit 208 before, while or soon after activating primary MOSFET 112, regardless of whether PSC logic circuit activates primary MOSFET 112 in response to receiving a corresponding control signal from SSC logic circuit 208. If SSC logic circuit 208 receives an acknowledgment signal that PSC logic circuit 206 activated primary MOSFET 112, SSC logic circuit 208 can quickly deactivate secondary MOSFET 116 and (optionally) send a control signal to deactivate the primary MOSFET 112, thereby protecting the converter. FIG. 4 illustrates an example method performed by PSC logic circuit 206 and SSC logic circuit 208 to implement a solution to the danger posed by an ESD event. The process shown in FIG. 4 starts when SSC logic circuit 208 begins a charging portion of a switching cycle and activates secondary MOSFET 116 as shown in step 402. SSC logic circuit 208 starts a timer. Then SSC logic circuit 208 generates and sends a control signal to deactivate the primary MOSFET 112. The signal is transmitted to PSC 206 via pulse transformer 120. If SSC logic circuit does not receive a separate acknowledgment signals from PSC logic circuit 206 that PSC logic circuit 206 has received the control signal sent in step 406 and that PSC logic circuit 206 has deactivated primary MOSFET 112 before the timer expires, SSC logic circuit 208 deactivates secondary MOSFET 116 in step 414 to prevent converter damage. If SSC logic circuit 208 receives the separate acknowledgment signals in step 410, SSC logic circuit 208 starts a process in step 412 in which it monitors for a signal from PSC control logic 206 that it has activated primary MOSFET 112 while secondary MOSFET 116 remains activated. If this happens, an ESD event is presumed and SSC logic circuit 208 deactivates the secondary MOSFET 116 as shown in step 414. The loop implemented by SSC logic circuit 208 and 412, ensures safe and reliable operation of AC flyback converter 200.

Figure 5:
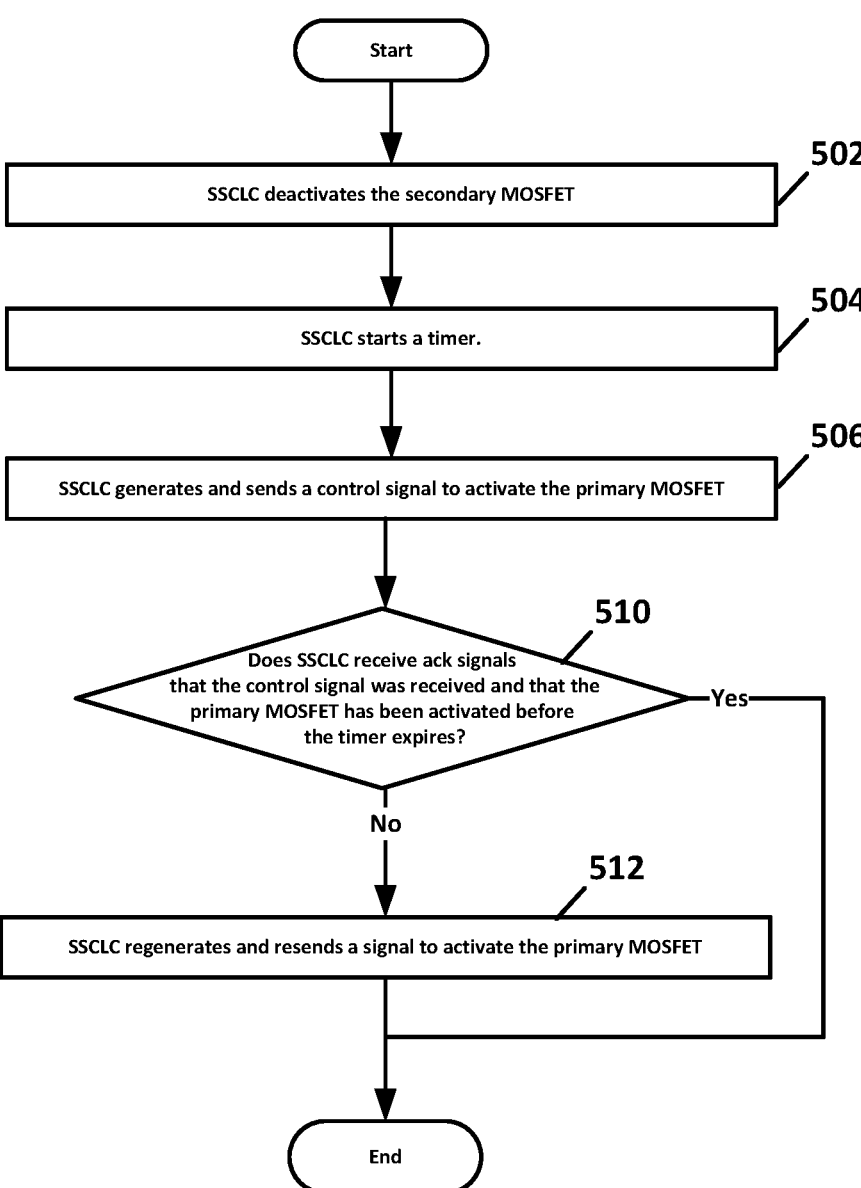
FIG. 5 is a flow diagram illustrating relevant aspects of a method employing one embodiment of the present disclosure.

USB-PD AC flyback converters 100 and 200 can provide output power to a device according to USB-PD requirements. For example, USB-PD AC flyback converters 100 and 200 provide output power to a USB-C connector, which requires the output power to be within +/−5% of specification. If PSC logic circuit 128 in converter 100 misses a control signal from SSC logic circuit 208 to activate primary MOSFET 112, there won't be any power delivered to the output in that switching cycle, and the output will start drooping and fail to meet specification requirements. With the improved communication provided by the present disclosure, if PSC logic circuit 206 misses a control signal to activate primary MOSFET 112, SSC logic circuit 208 will wait for a predefined amount of time and resend the same control signal. With continuing reference to FIG. 2, FIG. 5 illustrates an example process implemented by SSC logic circuit 208 for re-sending the control signal for activating primary MOSFET 112 according to an embodiment of the present disclosure. The process shown within FIG. 5 starts in step 502 when SSC logic circuit 208 deactivates secondary MOSFET 116 at the start of a charging cycle for AC flyback converter 200. In step 504 SSC logic circuit 208 starts a timer. In step 506 SSC control logic 208 generates and sends PSC control logic 206 a control signal to activate primary MOSFET 112. Then in step 510 SSC logic circuit 208 begins a process to monitor for separate acknowledgment signals from PSC logic circuit 206 that indicate PSC logic circuit 206 received the control signal sent in step 506, and that PSC logic circuit 206 activated primary MOSFET 112. If SSC logic circuit 208 does not receive both acknowledgment signals from PSC logic circuit 206 before the timer expires, then SSC logic circuit 208 resends the signal to activate primary MOSFET 112.

Figure 6A:
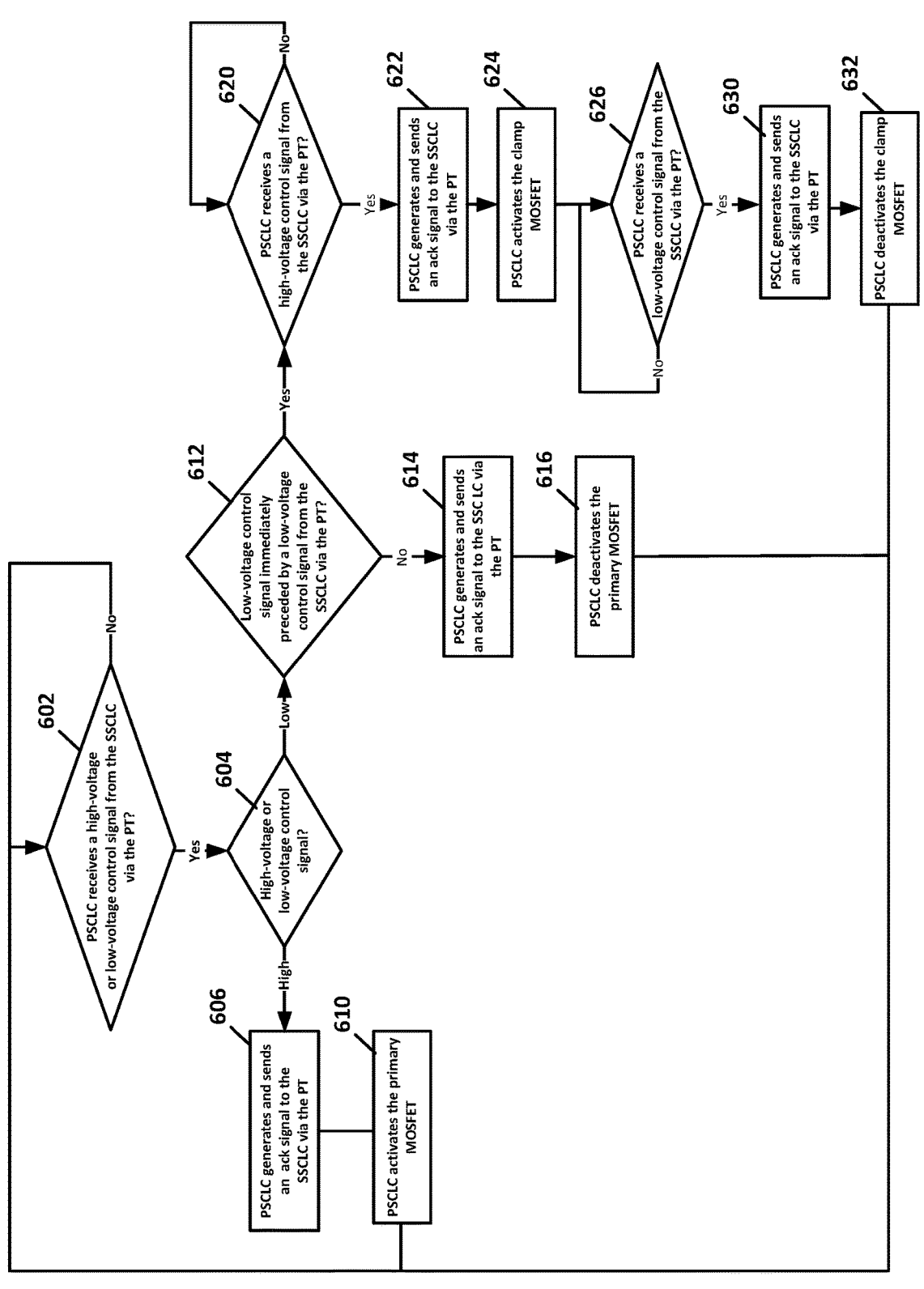
FIG. 6A is a flow diagram illustrating relevant aspects of a method employing one embodiment of the present disclosure.
Figure 6B:
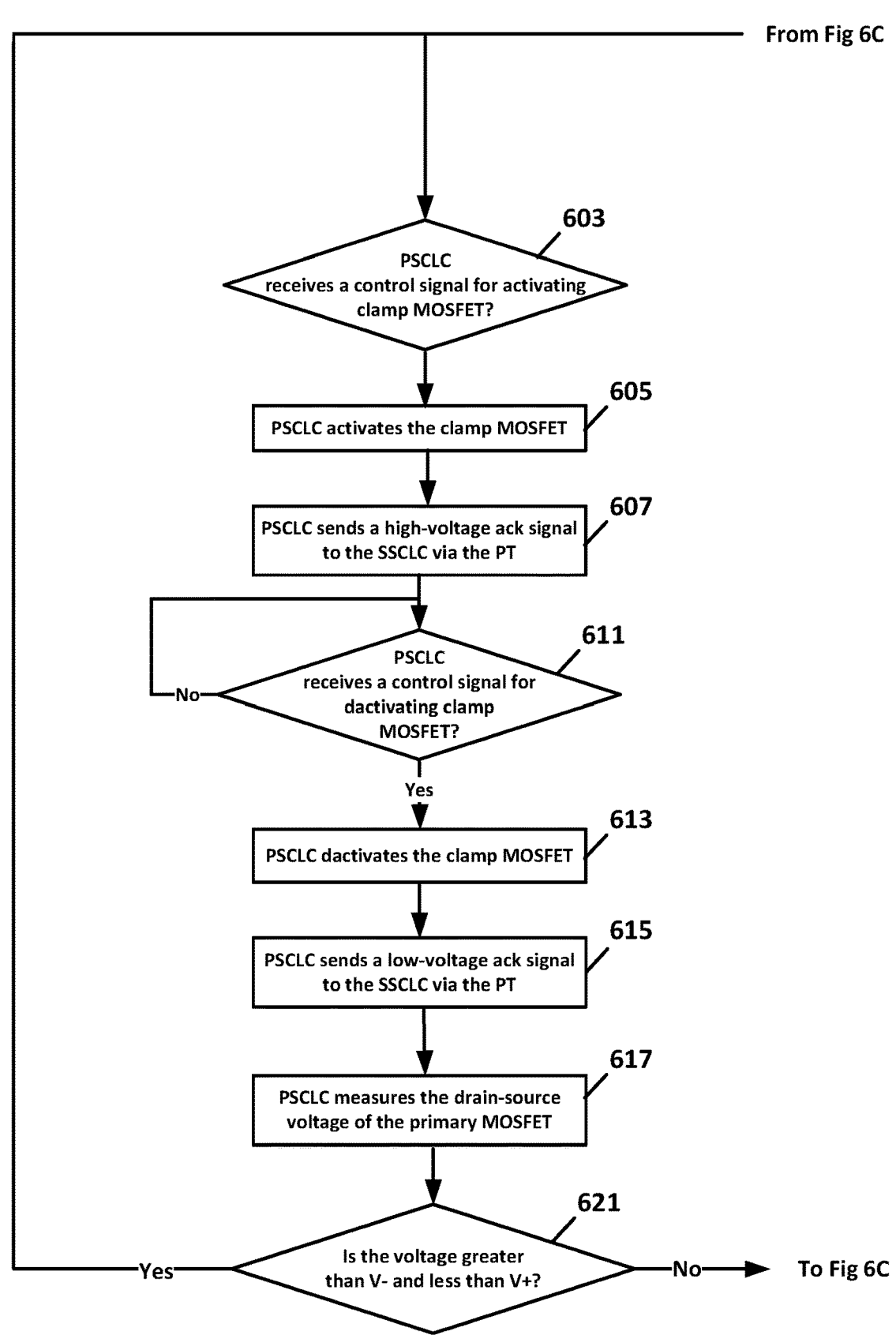
FIGS. 6B and 6C collectively show a flow diagram illustrating relevant aspects of a method employing one embodiment of the present disclosure.
Figure 6C:
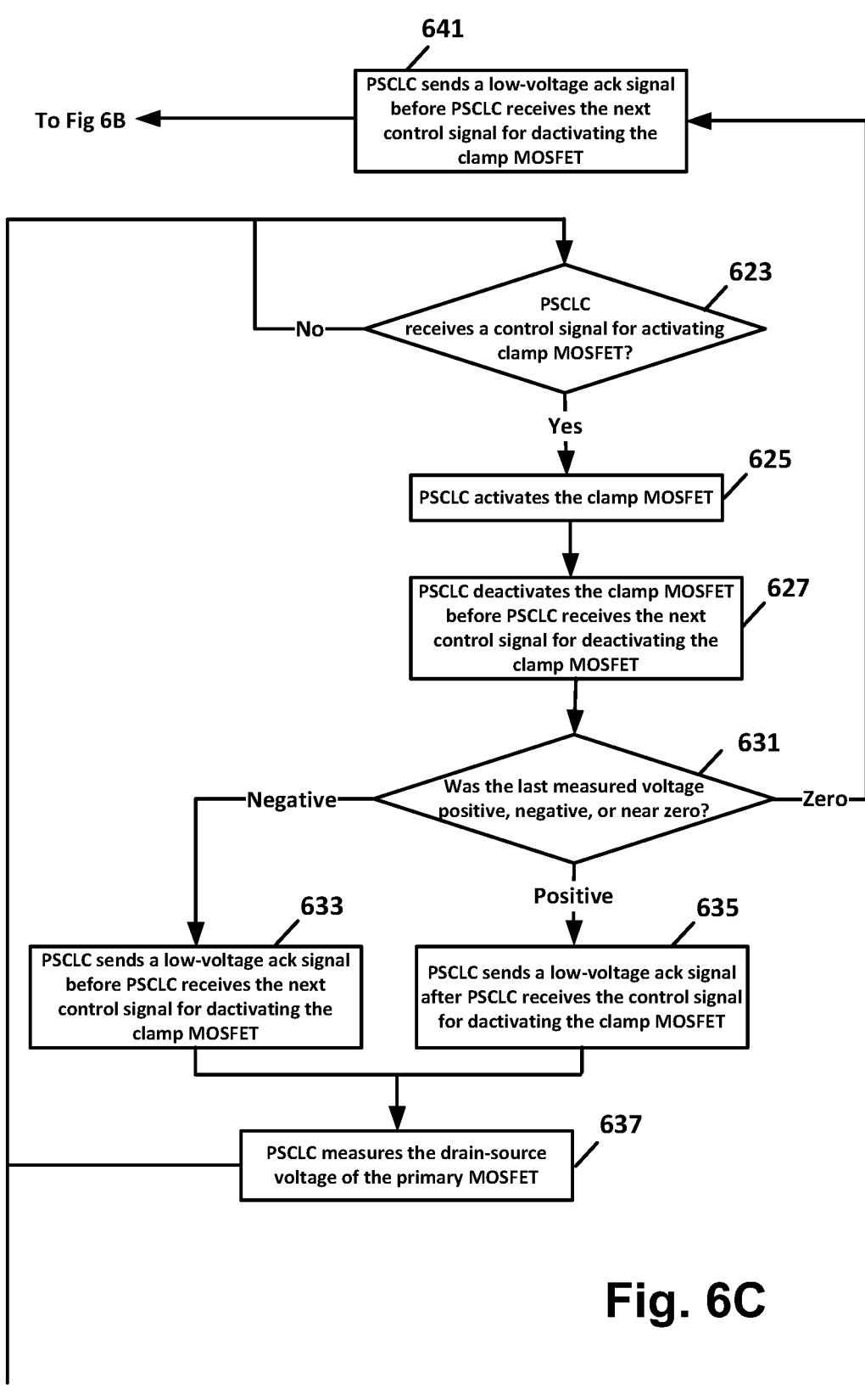

In secondary-side controlled USB-PD AC-DC converters the SSC controls both the clamp MOSFET and the primary MOSFET via the PSC. The present disclosure enables multi-level communication to control the clamp MOSFET and the primary MOSFET. SSC logic circuit 208 can send a low-voltage control signal or a high-voltage control signal during the switching cycle. In one embodiment, SSC logic circuit 208 can send a single low-voltage followed by a single high-voltage control signal to control primary MOSFET 112, or SSC logic circuit 208 can send two-low voltage control signals followed by a signal high-voltage signal to control clamp MOSFET 110. FIG. 6 illustrates an example multi-level communication process for controlling clamp MOSFET 110 and primary MOSFET 112. The process is implemented at any point in converter 200's switching cycle. In step 602 PSC logic circuit 306 receives a high-voltage or low-voltage control signal from SSC control logic 208 via pulse transformer 120. PSC logic circuit 206 determines whether the control signal received in step 602 is a high-voltage or a low-voltage control signal as shown in step 604. If a high-voltage control signal, the start of a charging portion of the switching cycle is presumed by PSC logic circuit 206. In step 606 PSC control logic 206 generates a high-voltage acknowledgment signal by quickly opening and closing switch 220. The acknowledgment signal is sent to SSC logic circuit 208 through pulse transformer 120. In step 610 PSC logic circuit 206 activates primary MOSFET 112. Although not shown, PSC logic circuit 206 can send another signal to SSC logic circuit 208, which acknowledges activation of primary MOSFET 112. If, however, PSC logic circuit 206 receives a low-voltage control signal in step 602, the low-voltage signal may be intended by SSC logic circuit 208 to end the charging portion of the switching cycle or to start the ACF portion. In step 612 PSC logic circuit 206 determines whether it received a low-voltage control signal immediately before PSC logic circuit 206 received the low-voltage control signal step 602. If not, PSC logic circuit 206 presumes the low-voltage signal is a command to end the charging cycle. PSC logic circuit 206 generates and sends SSC logic circuit 208 an acknowledgment signal in step 614. Then in step 616 PSC logic circuit 206 deactivates primary MOSFET 112, at which point PSC logic circuit 206 is put back into a state monitoring for the next high-voltage or low-voltage control signal from SSC logic circuit 208. On the other hand, if PSC logic circuit 206 determines in step 612 that a low-voltage control signal immediately preceded the low-voltage control signal received in step 602, then PSC logic circuit 206 presumes that an ACF portion of the switching cycle will be starting. The process proceeds to step 620 where PSC logic circuit 206 monitors for a high-voltage control signal from SSC logic circuit 208 via pulse transformer 120 that will start the ACF portion. When PSC logic circuit 206 receives the high-voltage control signal in step 620. PSC logic circuit 206 generates and sends an acknowledgment signal to SSC logic circuit 208 as shown in step 622. Then PSC logic circuit 206 activates clamp MOS-FET 110 shown in step 624 to begin the ACF portion of the switching cycle. PSC logic circuit 206 then monitors for a low-voltage control signal from SSC logic circuit 208 for deactivating clamp MOSFET 110 in step 626. When that signal is received, PSC logic circuit 206 generates and sends an acknowledgment signal to SSC logic circuit 208 via pulse transformer 120 in step 630. Finally PSC logic circuit 206 deactivates clamp MOSFET 110 as shown in step 632. Then PSC logic circuit 260 is put into a state in which it is monitoring for the next high voltage or low-voltage control signal from SSC logic circuit 206 shown in step 602.

Another problem in FIG. 1 is SSC 114's lack of information about the drain-source voltage on MOSFET 112. Since the information is unavailable to SSC 114, it operates on a predictive/formulated basis to decide the optimal time to deactivate clamp MOSFET 110 during ACF mode to achieve zero or near zero voltage across the current terminals of primary MOSFET 112. The present disclosure addresses this problem and provides a PSC that can iteratively send information to an SSC about the drain-source voltage on primary MOSFET 112. The SSC can use the information to dynamically increase or decrease the time duration in which clamp MOSFET 110 is activated, which in turn affects switching loses in primary MOSFET 110.

Figure 7:
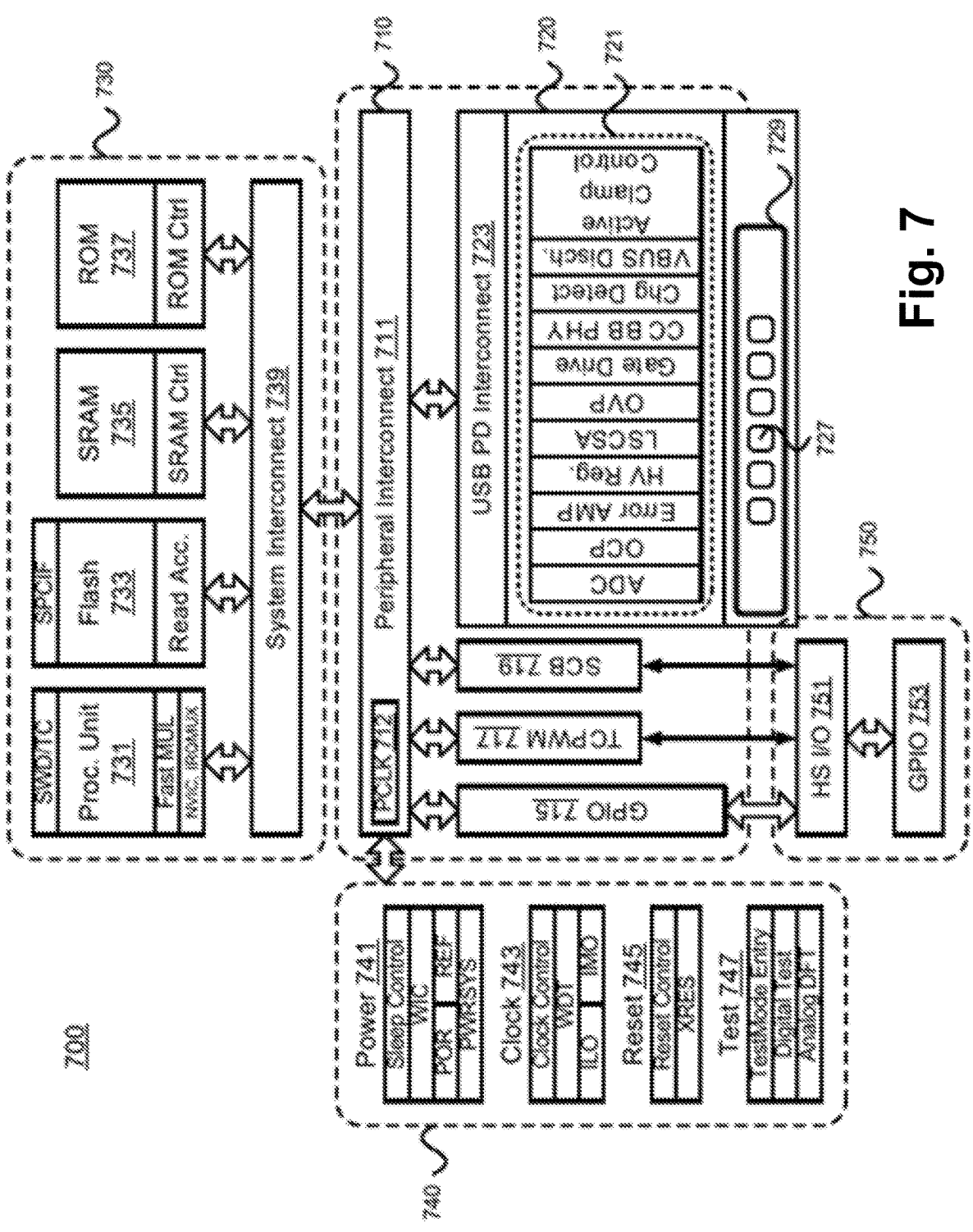
FIG. 7 is a block diagram illustrating a system for a USB device.

With continuing reference to FIG. 2, FIG. 7 illustrates an example process according to one embodiment of this disclosure in which PSC control logic 206 can provide drain-source voltage information to SSC control logic 208 that it can use to calibrate the time during which clamp MOSFET 110 is activated to achieve zero-voltage switching of primary MOSFET 112. The process starts in step 603 when PSC logic circuit 206 receives a control signal (e.g., a high-voltage control signal) from SSC logic circuit 208 to activate clamp MOSFET 110 and start the ACF portion of converter 200's switching cycle. In response PSC logic circuit 206 activates clamp MOSFET 110 in step 605 and sends an acknowledgment signal to SSC logic circuit 208 in step 607 by, for example, quickly closing and opening switch 220 as shown. PSC logic circuit 206 then waits to receive a control signal (e.g., a low-voltage control signal) from SSC control logic 208 to deactivate clamp MOSFET 110 as shown in step 611. When received, PSC logic circuit 206 deactivates clamp MOSFET 110 and sends an acknowledgment signal to SSC logic circuit 208 in step 615 by, for example, quickly closing and opening switch 222. After a predetermined delay PSC logic circuit 206 measures the voltage across the current terminals of primary MOSFET 112 as shown in step 617, and determines in step 621 if the measured voltage is greater than a predetermined negative voltage V– (e.g., –1 volt) and less than a predetermined positive voltage (e.g., +1 volt).

Ideally the source-drain voltage of primary MOSFET 112 should be as close as possible to zero to minimize switching loss in MOSFET 112. If PSC logic circuit 206 determines the source-drain voltage of primary MOSFET 112 is not greater than V– and is less than V+, switching loss in primary MOSFET 112 during the next cycle will be zero or near zero, and the process returns to step 603 without any need for SSC logic circuit 208 to adjust the duration of the time during which clamp MOSFET 110 is activated. Otherwise, the PSC logic 206 starts calibration process 623-641 in which PSC logic circuit 206 provides information to SSC logic circuit 208 that it can use to adjust the duration of the time during which clamp MOSFET 110 is activated.

In the first step 623 PSC logic circuit 206 monitors for a control signal from SSC logic circuit 208 for activating clamp MOSFET 212. When the control signal is received PSC logic circuit 206 activates clamp MOSFET 110, and sends an acknowledgment signal to SSC logic circuit 208 in step 625. Then, shortly after PSC logic circuit 206 activates clamp MOSFET 110 and before PSC logic circuit 206 receives a deactivation control signal from SSC logic circuit 208 for deactivating clamp MOSFET 110, PSC logic circuit 206 deactivates clamp MOSFET 110 as shown in step 627. PSC logic circuit 206 determines whether the last measured voltage across the current terminals of primary MOSFET 112 is positive (i.e., greater than predetermined positive voltage V+), or negative (i.e., less than negative predetermined voltage V–). If neither, than the last measured voltage is at zero or near zero. When the calibration process of 623-641 is first started or restarted after step 621, the voltage measured in step 617 is considered the last measured voltage.

PSC logic circuit 206 responds one of three ways depending upon the magnitude of the last measured voltage. During the first iteration of the calibration process shown in step 623-641, the measured voltage should be greater than a positive predetermined voltage V+ or less than a negative predetermined voltage V–. If negative (i.e., less than negative predetermined voltage V–), PSC logic circuit 206 generates and sends a low-voltage acknowledgment signal to SSC logic circuit 208, and this acknowledgment signal should be sent before PSC logic circuit 206 receives the next control signal from SSC logic circuit 208 for deactivating clamp MOSFET 110 as shown in step 633. The low-voltage acknowledgment signal can be generated by closing switch 222. SSC logic circuit 208 should recognize that it receives the low-voltage acknowledgment signal from PSC logic 206 before SSC logic circuit 208 sends the next control signal to PSC logic circuit 206 for deactivating clamp MOSFET 110, and SSC logic circuit 208 interprets this as an indication that the time during which clamp MOSFET 110 is activated, should be decreased by a predetermined amount T in the next cycle. If PSC logic circuit 206 determines in step 631 that the measured voltage is positive (i.e., greater than positive predetermined voltage V+), PSC logic circuit 206 generates and sends a low-voltage acknowledgment signal to SSC logic circuit 208, and this acknowledgment signal should be sent a predetermined amount of time after PSC logic circuit 206 receives the next control signal from SSC logic circuit 208 for deactivating clamp MOSFET 110 as shown in step 635. SSC logic circuit 208 should recognize that it receives the low-voltage acknowledgment signal from PSC logic 206 with delay after SSC logic circuit 208 sends the deactivation control signal to PSC logic circuit 206, and SSC logic circuit 208 interprets this delay as an indication that the time during which clamp MOSFET 110 is activated, should be increased by T in the next cycle. SSC logic circuit 208 increases or decreases the time between sending the clamp activation signal and clamp deactivation signal in the next cycle according to whether SSC logic circuit 208 receives the low-voltage acknowledgement signal that was sent in step 633 or step 635. In step 637 PSC logic circuit 206 remeasures the drain-source voltage of the primary MOSFET 110 a predetermined amount of time after PSC logic circuit 206 deactivates clamp MOSFET 110 in step 627, and the process returns to step 623 as shown in FIG. 7. After one or more iterations of the calibration process shown in step 623-641, the last measured voltage should be zero or near zero (between V+ and V−). When the last measured voltage across primary MOSFET 112 is determined to be zero or near in step 631, PSC logic circuit 206 sends a low-voltage acknowledgment signal before PSC logic circuit 206 receives the next control signal from SSC logic circuit 208 for deactivating clamp MOSFET as shown in step 641, and the calibration process ends with a return to step 603.

FIG. 7 is a block diagram illustrating a system 700 for a USB device with a secondary-controlled AC flyback circuit for use in USB power delivery in accordance with some embodiments. System 700 may include a peripheral subsystem 710 including a number of components for use in USB Power Delivery (USB-PD). Peripheral subsystem 710 may include a peripheral interconnect 711 including a clocking module, peripheral clock (PCLK) 712 for providing clock signals to the various components of peripheral subsystem 710. Peripheral interconnect 711 may be a peripheral bus, such as a single-level or multi-level advanced high-performance bus (AHB), and may provide a data and control interface between peripheral subsystem 710, CPU subsystem 730, and system resources 740. Peripheral interconnect 711 may include controller circuits, such as direct memory access (DMA) controllers, which may be programmed to transfer data between peripheral blocks without input by, control of, or burden on CPU subsystem 730.

The peripheral interconnect 711 may be used to couple components of peripheral subsystem 710 to other components of system 700. Coupled to peripheral interconnect 711 may be a number of general purpose input/outputs (GPIOs) 715 for sending and receiving signals. GPIOs 715 may include circuits configured to implement various functions such as pull-up, pull-down, input threshold select, input and output buffer enabling/disable, single multiplexing, etc. Still other functions may be implemented by GPIOs 715. One or more timer/counter/pulse-width modulator (TCPWM) 717 may also be coupled to the peripheral interconnect and include circuitry for implementing timing circuits (timers), counters, pulse-width modulators (PWMs) decoders, and other digital functions that may operate on I/O signals and provide digital signals to system components of system 700. Peripheral subsystem 710 may also include one or more serial communication blocks (SCBs) 719 for implementation of serial communication interfaces such as I2C, serial peripheral interface (SPI), universal asynchronous receiver/transmitter (UART), controller area network (CAN), clock extension peripheral interface (CXPI), etc.

To implement the techniques for bi-directional communications by either a primary-side controller (PSC) or a secondary-side controller (SSC) as described in the present disclosure, peripheral subsystem 710 may include a USB-PD subsystem 720 coupled to the peripheral interconnect and comprising a set of USB-PD modules 721 for use in USB power delivery. USB-PD modules 721 may be coupled to the peripheral interconnect 711 through a USB-PD interconnect 623. USB-PD modules 721 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 700; a low-side current sense amplifier (LSCSA) for measuring load current accurately, an over-voltage protection (OVP) module and an OCP module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 721 may also include a charger detection module for determining that a charging circuit is present and coupled to system 700 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 720 may also include pads 727 for external connections and electrostatic discharge (ESD) protection circuitry 729, which may be required on a Type-C port. USB-PD modules 721 may also include a communication module for retrieving and communicating information, such as control signals such as from a secondary-side controller to a primary-side controller. In one embodiment, the USB-PD modules 721 include an active clamp control module in a secondary-side controller to control an active clamp FET disposed on a primary side (e.g., primary side of an AC-DC flyback converter).

GPIO 715, TCPWM 717, and SCB 719 may be coupled to an input/output (I/O) subsystem 750, which may include a high-speed (HS) I/O matrix 751 coupled to a number of GPIOs 753. GPIOs 715, TCPWM 717, and SCB 719 may be coupled to GPIOs 753 through HS I/O matrix 751.

System 700 may also include a central processing unit (CPU) subsystem 730 for processing commands, storing program information, and data. CPU subsystem 730 may include one or more processing units 731 for executing instructions and reading from and writing to memory locations from a number of memories. Processing unit 731 may be a processor suitable for operation in an integrated circuit (IC) or a system-on-chip (SOC) device. In some embodiments, processing unit 731 may be optimized for low-power operation with extensive clock gating. In this embodiment, various internal control circuits may be implemented for processing unit operation in various power states. For example, processing unit 731 may include a wake-up interrupt controller (WIC) configured to wake the processing unit up from a sleep state, allowing power to be switched off when the IC or SOC is in a sleep state. CPU subsystem 730 may include one or more memories, including a flash memory 733, and static random access memory (SRAM) 735, and a read-only memory (ROM) 737. Flash memory 733 may be a non-volatile memory (NAND flash, NOR flash, etc.) configured for storing data, programs, and/or other firmware instructions. Flash memory 733 may include a read accelerator and may improve access times by integration within CPU subsystem 730. SRAM 735 may be a volatile memory configured for storing data and firmware instructions accessible by processing unit 731. ROM 737 may be configured to store boot-up routines, configuration parameters, and other firmware parameters and settings that do not change during operation of system 700. SRAM 735 and ROM 737 may have associated control circuits. Processing unit 731 and the memories may be coupled to a system interconnect 739 to route signals to and from the various components of CPU subsystem 730 to other blocks or modules of system 700. System interconnect 639 may be implemented as a system bus such as a single-level or multi-level AHB. System interconnect 739 may be configured as an interface to couple the various components of CPU subsystem 730 to each other. System interconnect 739 may be coupled to peripheral interconnect 711 to provide signal paths between the components of CPU subsystem 730 and peripheral subsystem 710.

System 700 may also include a number of system resources 740, including a power module 741, a clock module 743, a reset module 745, and a test module 747. Power module 741 may include a sleep control module, a wake-up interrupt control (WIC) module, a power-on-reset (POR) module, a number of voltage references (REF), and a PWRSYS module. In some embodiments, power module 741 may include circuits that allow system 700 to draw and/or provide power from/to external sources at different voltage and/or current levels and to support controller operation in different power states, such as active, low-power, or sleep. In various embodiments, more power states may be implemented as system 700 throttles back operation to achieve a desired power consumption or output. For example, the secondary-side controller may access secondary electrical parameters on the secondary side. At low line and light load, the secondary-side controller may determine that the power state is such that it is not beneficial to switch on the active clamp FET. Clock module 743 may include a clock control module, a watchdog timer (WDT), an internal low-speed oscillator (ILO), and an internal main oscillator (IMO). Reset module 745 may include a reset control module and an external reset (XRES) module. Test module 747 may include a module to control and enter a test mode as well as testing control modules for analog and digital functions (digital test and analog DFT).

System 700 may be implemented in a monolithic (e.g., single) semiconductor die. In other embodiments, various portions or modules of system 700 may in implemented on different semiconductor dies. For example, memory modules of CPU subsystem 730 may be on-chip or separate. In still other embodiments, separate-die circuits may be packaged into a single "chip," or remain separate and disposed on a circuit board (or in a USB cable connector) as separate elements.

System 700 may be implemented in a number of application contexts to provide USB-PD functionality thereto. In each application context, an IC controller or SOC implementing system 700 may be disposed and configured in an electronic device (e.g., a USB-enabled device) to perform operations in accordance with the techniques described herein. In one example embodiment, a system 700 may be disposed and configured in a personal computer (PC) power adapter for a laptop, a notebook computer, etc. In another example embodiment, system 700 may be disposed and configured in a power adapter (e.g., a wall charger) for a mobile electronic device (e.g., a smartphone, a tablet, etc.). In another example embodiment, system 700 may be disposed and configured in a wall socket that is configured to provide power over USB Type-A and/or Type-C port(s). In yet another example embodiment, system 700 may be disposed and configured in a power bank that can get charged and then provide power to another electronic device over a USB Type-A or Type-C port. In other embodiments, a system like system 700 may be configured with the power switch gate control circuitry described herein and may be disposed in various other USB-enabled electronic or electromechanical devices.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as data, bits, values, elements, symbols, characters, terms, numbers, or the like.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing," "generating," "determining," "placing," or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for a secondary-side controlled Universal Serial Bus Power Delivery (USB-PD) converter, the method comprising:

a secondary-side controller, of the USB-PD converter, generating a first control signal;

a primary-side controller, of the USB-PD converter, receiving the first control signal via a first transformer of the USB-PD converter;

the primary-side controller activating or deactivating a first primary-side switch coupled to a primary winding of a second transformer of the USB-PD converter in response to the primary-side controller receiving the first control signal via the first transformer;

the primary-side controller generating a first acknowledgement signal in response to the generating a first signal for activating or deactivating the first primary-side switch;

the secondary-side controller receiving the first acknowledgement signal via the first transformer, wherein the primary-side controller comprises an acknowledgement generator including gate drivers that drive first and second switches connected in series between a supply voltage and a primary-side ground, the acknowledgement generator being configured to produce distinct high-voltage and low-voltage pulse acknowledgements across the first transformer by opening and closing the first and second switches.

2. The method of claim 1:

wherein the first control signal comprises a pulse signal;

wherein the first acknowledgment signal comprises a pulse signal.

3. The method of claim 1:

wherein the primary-side controller activates the first primary-side switch in response to the primary-side controller receiving the first control signal via the first transformer;

wherein the method further comprises:

the secondary-side controller generating a second control signal;

the primary-side controller receiving the second control signal via the first transformer;

the primary-side controller deactivating the first primary-side switch in response to the primary-side controller receiving the second control signal via the first transformer;

the primary-side controller generating a second acknowledgement signal in response to the primary-side controller receiving the second control signal via the first transformer;

the secondary-side controller receiving the second acknowledgement signal via the first transformer.

4. The method of claim 3:

wherein the first and second control signals are positive and negative voltage pulse signals, respectively;

wherein the first and second acknowledgement signals are positive and negative voltage pulse signals, respectively.

5. The method of claim 3 further comprising:

the secondary-side controller activating a secondary-side switch coupled to a secondary winding of the second transformer in response to the secondary-side controller receiving the second acknowledgement signal via the first transformer;

the primary-side controller activating the first primary-side switch while the secondary-side switch is activated;

the primary-side controller generating a third acknowledgement signal in response to the primary-side controller activating the first primary-side switch while the secondary-side switch is activated;

the secondary-side controller receiving the third acknowledgment signal via the first transformer while the secondary-side switch is activated;

the secondary-side controller deactivating the secondary-side switch in response to the secondary-side controller receiving the third acknowledgment signal via the first transformer.

6. The method of claim 1 further comprising:

the secondary-side controller generating a second control signal;

the secondary-side controller generating a third control signal in response to the secondary-side controller not receiving an acknowledgement signal within a predetermined amount of time after the secondary-side controller generates the second control signal.

7. The method of claim 4 further comprising:

the secondary-side controller generating a negative voltage control signal;

the primary-side controller receiving the negative voltage control signal via the first transformer;

the secondary-side controller generating a positive voltage control signal in response to the secondary-side controller receiving a third acknowledgement signal from the primary-side controller via the first transformer within a predetermined amount of time after the secondary-side controller generates the negative voltage control signal;

the primary-side controller receiving the positive voltage control signal via the first transformer;

the primary-side controller activating a second primary-side switch (HIGH SIDE CLAMP FET) coupled to the primary winding in response to the primary-side controller receiving the positive voltage control signal via the first transformer;

the secondary-side controller generating another negative voltage control signal when the secondary-side controller does not receive the third acknowledgement signal from the primary-side controller via the first transformer within the predetermined amount of time after the secondary-side controller generates the negative voltage control signal.

8. The method of claim 1 further comprising:

wherein the primary-side controller activates the first primary-side switch in response to the primary-side controller receiving the first control signal via the first transformer;

wherein the method further comprises:

wherein the primary-side controller deactivates the first primary-side switch in response to the primary-side controller receiving a second control signal via the first transformer;

the primary-side controller measuring a voltage across current terminals of a second primary-side switch;

the primary-side controller comparing the measured voltage to a predefined voltage range;

the secondary-side controller adjusting a duration of time period during which the first primary-side switch is activated in a subsequent cycle in response to the primary controller determining the measured voltage is not in the predefined voltage range.

9. A Universal Serial Bus Power Delivery (UDB-PD) power converter comprising:

a pulse transformer;

a secondary-side controller in data communication with the pulse transformer;

a primary-side controller in data communication with the pulse transformer;

wherein the secondary-side controller is configured to generate control signals;

wherein the secondary-side controller is configured to receive acknowledgement signals from the primary-side controller via the pulse transformer;

wherein the primary-side controller is configured to generate the acknowledgment signals;

wherein the primary-side controller is configured receive the control signals from the secondary-side controller via the pulse transformer, wherein the primary-side controller generates an acknowledgement signal in response to generating a first signal for activating or deactivating a first primary-side switch; and wherein the primary-side controller comprises an acknowledgement generator including gate drivers that drive first and second switches connected in series between a supply voltage and a primary-side ground, the acknowledgement generator being configured to produce distinct high-voltage and low-voltage pulse acknowledgements across the pulse transformer by opening and closing the first and second switches.

10. The USB-PD power converter of claim 9 further comprising:

a flyback transformer comprising a primary winding and a secondary winding;

a first primary-side switch connected to the primary winding and controlled by the primary-side controller based on control signals the primary-side controller receives from the secondary-side controller via the pulse transformer;

a secondary-side switch connected to the secondary winding and controlled by the secondary-side controller based on acknowledgment signals received from the primary-side controller via the pulse transformer.

11. The USB-PD power converter of claim 10:

wherein the primary-side controller is configured to receive a first control signal from the secondary-side controller via the pulse transformer;

wherein the primary-side controller is configured to activate or deactivate the first primary-side switch in response to the primary-side controller receiving the first control signal via the pulse transformer;

wherein the primary-side controller is configured to generate a first acknowledgement signal in response to generating a first signal for activating or deactivating the first primary-side switch;

wherein the secondary-side controller is configured to receive the first acknowledgement signal via the pulse transformer.

12. The USB-PD power converter of claim 11:

wherein the first control signal comprises a one of a positive voltage pulse signal and a negative voltage pulse signal;

wherein the first acknowledgment signal comprises a one of a positive voltage pulse signal and a negative voltage pulse signal.

13. The USB-PD power converter of claim 11:

wherein the primary-side controller is configured to activate the first primary-side switch in response to the primary-side controller receiving the first control signal via the pulse transformer;

wherein the secondary-side controller is configured to generate a second control signal;

wherein the primary-side controller is configured to receive the second control signal via the pulse transformer;

wherein the primary-side controller is configured to deactivate the first primary-side switch in response to the primary-side controller receiving the second control signal via the pulse transformer;

wherein the primary-side controller is configured generate a second acknowledgement signal in response to the primary-side controller receiving the second control signal via the pulse transformer;

wherein the secondary-side controller is configured to receive the second acknowledgement signal via the pulse transformer.

14. The USB-PD power converter of claim 13:

wherein the first and second control signals are positive and negative voltage pulse signals, respectively;

wherein the first and second acknowledgement signals are positive and negative voltage pulse signals, respectively.

15. The USB-PD power converter of claim 13:

wherein the secondary-side controller is configured to activate a secondary-side switch coupled to a secondary winding of the flyback transformer in response to the secondary-side controller receiving the second acknowledgement signal via the pulse transformer;

wherein the primary-side controller is configured to activate the first primary-side switch while the secondary-side switch is activated;

wherein the primary-side controller is configured to generate a third acknowledgement signal in response to the primary-side controller activating the first primary-side switch while the secondary-side switch is activated;

wherein the secondary-side controller is configured to receive the third acknowledgment signal via the pulse transformer while the secondary-side switch is activated;

wherein the secondary-side controller is configured to deactivate the secondary-side switch in response to the secondary-side controller receiving the third acknowledgment signal via the pulse transformer.

16. The USB-PD power converter of claim 11:

wherein the secondary-side controller is configured to generate a second control signal;

wherein the secondary-side controller is configured to generate a third control signal in response to the secondary-side controller not receiving an acknowledgement signal within a predetermined amount of time after the secondary-side controller generates the second control signal.

17. The USB-PD power converter of claim 14 further comprising:

wherein the secondary-side controller is configured to generate a negative voltage control signal;

wherein the primary-side controller is configured to receive the negative voltage control signal via the pulse transformer;

wherein the secondary-side controller is configured to generate a positive voltage control signal in response to the secondary-side controller receiving a third acknowledgement signal from the primary-side controller via the pulse transformer within a predetermined amount of time after the secondary-side controller generates the negative voltage control signal;

wherein the primary-side controller is configured to receive the positive voltage control signal via the pulse transformer;

wherein the primary-side controller is configured to activate a second primary-side switch coupled to the primary winding in response to the primary-side controller receiving the positive voltage control signal via the pulse transformer;

wherein the secondary-side controller is configured to generate another negative voltage control signal when the secondary-side controller does not receive the third acknowledgement signal from the primary-side controller via the pulse transformer within the predetermined amount of time after the secondary-side controller generates the negative voltage control signal.

18. The USB-PD power converter of claim 11:

wherein the primary-side controller is configured to activate the first primary-side switch in response to the primary-side controller receiving the first control signal via the pulse transformer;

wherein the primary-side controller is configured to deactivate the first primary-side switch in response to the primary-side controller receiving a second control signal via the pulse transformer;

wherein the primary-side controller is configured to measure a voltage across current terminals of a second primary-side switch;

wherein the primary-side controller is configured to compare the measured voltage to a predefined voltage range;

wherein the secondary-side controller is configured to adjust a duration of time period during which the first primary-side switch is activated in a subsequent cycle in response to the primary controller determining the measured voltage is not in the predefined voltage range.

19. A Universal Serial Bus Power Delivery (USB-PD) power adapter comprising:

a USB-C port;

a flyback transformer coupled to the USB-C port;

a pulse transformer;

a primary-side controller coupled to the pulse transformer and configured to control operation of the flyback transformer; and a secondary-side controller coupled to the USB-C port and to the pulse transformer, the secondary-side controller configured for data communication with the primary-side controller in the USB-PD power adapter via the pulse transformer;

wherein the secondary-side controller is configured to generate control signals for indirectly controlling switches connected to a primary winding of the flyback transformer;

wherein the secondary-side controller is configured to receive acknowledgement signals from the primary-side controller via the pulse transformer;

wherein the secondary-side controller is configured to control a secondary-side switch connected to a secondary winding of the flyback transformer based on acknowledgment signals received from the primary-side controller via the pulse transformer wherein the primary-side controller generates an acknowledgement signal in response to generating a first signal for activating or deactivating a first primary-side switch; and wherein the primary-side controller comprises an acknowledgement generator including gate drivers that drive first and second switches connected in series between a supply voltage and a primary-side ground, the acknowledgement generator being configured to produce distinct high-voltage and low-voltage pulse acknowledgements across the pulse transformer by opening and closing the first and second switches.

* * * * *